(12) United States Patent
Morimoto et al.

(10) Patent No.: US 6,513,277 B1
(45) Date of Patent: Feb. 4, 2003

(54) PASS-THROUGH FISHING ROD AND METHOD OF MANUFACTURING SAME

(75) Inventors: Kazuya Morimoto, Sakai (JP); Nobuyoshi Utsuno, Sakai (JP); Isamu Tokuda, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 08/486,494

(22) Filed: Jun. 7, 1995

(30) Foreign Application Priority Data

Aug. 10, 1994 (JP) .............................. 6-187986

(51) Int. Cl.⁷ .............................................. A01K 87/00
(52) U.S. Cl. ......................................................... 43/18.1
(58) Field of Search ........................................ 43/18.1

(56) References Cited

U.S. PATENT DOCUMENTS

| | | | |
|---|---|---|---|
| 2,777,239 A | | 1/1957 | Cushman ........................ 43/18 |
| 3,447,254 A | * | 6/1969 | Sobel et al. ................... 43/18.1 |
| 3,862,509 A | * | 1/1975 | Petersen, Jr. ............... 43/18.1 X |
| 5,245,779 A | * | 9/1993 | Suzue et al. ................. 43/18.5 |
| 5,328,742 A | * | 7/1994 | Tukihara .................. 43/18.1 X |
| 5,488,797 A | * | 2/1996 | Akiba .......................... 43/18.1 |

FOREIGN PATENT DOCUMENTS

| | | | |
|---|---|---|---|
| DE | 42 03 579 | | 8/1992 |
| FR | 2029828 | | 10/1970 |
| FR | 2123967 | | 8/1972 |
| GB | 1127756 | | 9/1968 |
| GB | 1526582 | | 9/1978 |
| GB | 2165431 | | 4/1986 |
| JP | 63-278827 | * | 11/1988 |
| JP | 1-165328 | | 6/1989 |
| JP | 1-304836 | | 12/1989 |
| JP | 3-143463 | * | 6/1991 |
| JP | 5-88259 | | 12/1993 |

* cited by examiner

Primary Examiner—Joseph J. Hail, III
(74) Attorney, Agent, or Firm—Jeffer, Mangels, Butler & Marmaro LLP

(57) ABSTRACT

A pass-through fishing rod has a rod body made from resin and reinforcing fibers. The rod body has an inner circumferential surface, wherein concave surface portions and convex surface portions are formed in the inner circumferential surface of the rod body. The reinforcing fibers are applied to the convex surface portions in the circumferential direction.

16 Claims, 6 Drawing Sheets

PASS-THROUGH FISHING ROD AND METHOD OF MANUFACTURING SAME

FIELD OF THE INVENTION

This invention relates to a pass-through fishing rod in which notched portions and protrusive portions are formed on the inner circumferential surface of a fishing rod body comprising a material made from resin and reinforcing fibers, and to its manufacturing method.

BACKGROUND OF THE INVENTION

The applicant has already proposed a pass-through fishing rod (Japanese Utility Application No. 88259/93) where a fishing line extends through the hollow center of the fishing rod. The gist of the proposal is the formation of notched/protrusive inner-circumferential surface in the fishing rod material made from resin and reinforcing fibers. By such a structure, a fishing line can be held by the protrusive portions and lifted up from the inner-surface of the fishing rod so that the friction resistance which is generated by winding and unwinding of the fishing line can be mitigated. If a spiral is stored within the fishing rod and forms protrusive portions as shown in the Japanese Patent Application No. 304836/89, for example, there is a problem that this spiral could come off the inner-surface of the fishing rod when the rod is bent because the protrusive portions and the inner-surface are separate things. In the prior application stated in the Japanese Utility Application No. 88259/93, however, the inner-surface of the fishing rod itself forms protrusive portions. Therefore, the protrusive portions should not come off when the fishing rod is bent.

As mentioned above, though the prior art has already had a basic effect that the protrusive portions hardly come off the inner-surface of the fishing rod, this structure does not offer sufficient strength for use in a long run as the fishing rod material itself forms protrusive portions. Therefore, some countermeasure has been needed to solve this problem.

SUMMARY OF THE PREFERRED EMBODIMENTS

The objective of this invention is to place reinforcing fibers in order to further strengthen the aforesaid basic effect.

A characteristic structure offered by this invention is formation of the inner circumferential surface of the fishing rod body, comprising a material which is made from resin and reinforcing fibers, in a notched/protrusive shape as well as application of reinforcing fibers to the protrusive portions in the circumferential direction.

By applying reinforcing fibers to the protrusive portion, the protrusive portion itself can be reinforced by the fibers. Hence, strength against curvature caused by contacts of the line at times of winding and unwinding can be improved.

By this working, abrasion of the protrusive portions can be restrained even in use for long periods of time, and stable line-holding function can be ensured. Furthermore, as the reinforcing fibers are set in the direction of the circumference of the fishing rod, the load of the line can be received by the reinforcing fibers which are placed to cross the line at about a right angle even if the contact point between the line and a protrusive portion is moved in the circumferential direction.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIGS. 1(a)–(d) are perspective views to show the first processes in the fishing rod manufacturing processes, in which FIG. 1(a) illustrates applying the wax; FIG. 1(b) illustrates winding the mold releasing tape; FIG. 1(c) illustrates winding the notched/protrusive forming tape; and FIG. 1(d) illustrates winding the mold releasing tape.

FIGS. 2(a)–(d) are perspective views to show the interim processes in the fishing rod manufacturing processes, in which FIG. 2(a) shows winding the prepreg tape of the first layer; FIG. 2(b) shows winding the prepreg pattern; FIG. 2(c) shows winding the prepreg tape of the second layer; and FIG. 2(d) shows winding the form-maintaining tape.

FIGS. 3(a)–(c) are perspective views to show the last processes in the fishing rod manufacturing processes, in which FIG. 3(a) illustrates hardening the fishing rod; FIG. 3(b) illustrates peeling off the form-maintaining tape; and FIG. 3(c) illustrates peeling off the notched/protrusive forming tape.

DETAILED DESCRIPTION OF THE PREFERRED EMBODIMENTS

Figure 1A:
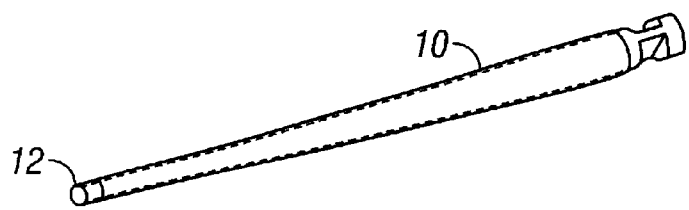

A preferred embodiment of the present invention affords quick discharge of water brought into the fishing rod by making flow of the water smooth. A structure employed for this purpose is that the notched/protrusive surface in the structure of the inventive fishing rod assumes tiers whose diameter gets smaller as it gets closer to the front end. Its working and effect are as follows: When the fishing rod is placed vertically, water brought into the rod runs down the notched/protrusive inner surface and is collected at either end of the rod. The water can be discharged out from the aperture at the front end of the rod or a hole made in order to insert the line from a reel into the rod. Thanks to this structure, there will be almost no chances for water attached to the inner-surface of the rod, etc. to touch the line.

Furthermore, as the reinforcing fibers are placed in the circumferential direction of the fishing rod, the reinforcing fibers and the notched/protrusive surface in tiers are positioned in approximately the same direction. Therefore, the reinforcing fibers conform with the uneven notched/protrusive inner surface of the rod since some of the reinforcing fibers are wound circumferentially around the rod during the construction of the rod. Hence, the reinforcing fibers provide strength and support throughout the rod length, including within the uneven inner surface of the rod, since the reinforcing fibers are disposed within the notched/protrusive surface portions of the rod. Therefore, the reinforcing fibers can fully exert their reinforcement effect for the protrusive portions.

According to another preferred embodiment of the present invention, the notched/protrusive surface in the structure of the inventive fishing rod assumes a spiral whose diameter is reduced as it gets closer to the front end. Its working and effect are as follows: When the fishing rod is placed vertically, water brought into the fishing rod runs down the continuously-helical surface. Therefore, it is easier for water to run down than in case of the notched/protrusive surface in tiers, hence discharge of water from the fishing rod is even easier. Also, when the fishing rod is shaken, the water can run along the spiral and be discharged from the spearhead of the fishing rod.

An additional preferred embodiment of the present invention makes formation of the notched/protrusive inner-surface of the fishing rod comparatively easy, and offers a device which can mitigate the friction resistance of the line at times of winding and unwinding of the fishing line. According to this preferred embodiment, the inner circumferential surface of the fishing rod body is formed into notched/protrusive shape by applying a mold releasing agent to a mold core; winding notched/protrusive forming tape to form the aforesaid notched/protrusive surface round the outer circumferential surface of the mandrel to which the mold releasing agent is applied in the axial direction of the mandrel at fixed intervals, thereby forming a mold core; forming a fishing rod body by winding a fishing rod material made from resin and reinforcing fibers around the mold core, and winding form-maintaining tape round the outer circumferential surface of the aforementioned fishing rod body; and subsequently hardening the fishing rod body, removing the mandrel, peeling off the form-maintaining tape and releasing the notched/protrusive forming tape from the fishing rod body.

Its working and effect are as follows: By winding notched/protrusive forming tape in the axial direction at fixed intervals, forming gaps therebetween, the aforementioned fishing rod material comes into the gaps of the notched/protrusive forming tape during hardening. When the notched/protrusive forming tape is removed after hardening, the tape-removed portion remains as notched portions and the portion where the fishing rod material has come into remains as protrusive portions. Thus, notched/protrusive surface is formed inside the fishing rod body.

This method can contribute to cost reduction as it employs an easy manufacturing method of simply winding tape at certain intervals in order to form a notched/protrusive surface Wax is applied to the mold core before forming the protrusive surface, and therefore, the wax remains on the protrusive portions of the inner surface of the rod even after removal of the mold core. This wax exerts a water-repellent effect and, at the same time, serves as sliding agent being positioned between the protrusive portions and the line which touches the protrusive portions. This results in further reduction of the friction resistance between the inner surface of the rod and the line.

A further preferred embodiment of the present invention provides a method of manufacturing pass-through fishing rods by which notched/protrusive forming tape can be removed easily after hardening. According to this preferred embodiment, a mold releasing tape is wound between the mold releasing agent and the notched/protrusive forming tape, and between the notched/protrusive forming tape and the fishing rod body. By this winding, removal after hardening becomes easier, a notched/protrusive surface can be formed as expected, and there will be no increase in the friction resistance made by the line.

Still another preferred embodiment of the present invention positions reinforcing fibers in the notched portions and protrusive portions in the inner surface of the fishing rod so that they can fully exert their reinforcement effect.

According to this preferred embodiment, a fishing rod body is formed by the first layer where narrow prepreg tape, in which reinforcing fibers are placed in the circumferential direction, is placed along the circumferential direction as well as in the axial direction at fixed intervals, and the second layer where prepreg tape, which is composed of reinforcing fibers and resin, is placed in the axial direction without any intervals in order to form the inner circumferential surface of the fishing rod body into a notched/protrusive shape.

Its working and effect are as follows: Forming a notched/protrusive surface mitigates the friction resistance made by the line at times of winding and unwinding. At the same time, as the reinforcing fibers of the first layer which forms a protrusive portion are placed in the circumferential direction, the reinforcing fibers can exert their reinforcement effect for the protrusive portion even if the contact point between the line and the protrusive portion moves in the circumferential direction because the reinforcing fibers are still there. Furthermore, the aforementioned second layer has reinforcing fibers that are also placed about the mold core in the circumferential direction. The reinforcing fibers thus do not meander from the position where they should be placed and they can fully exert their reinforcement function for the protrusive portions.

Yet another preferred embodiment of the present invention offers a pass-through fishing rod which can maintain a basic strength as a fishing rod while maintaining the advantages of the foregoing embodiment. According to this preferred embodiment, the direction of the reinforcing fibers of the prepreg is set in the aforesaid second layer at the circumferential direction as described above.

Its working and effect are as follows: As reinforcing fibers of the second layer, which are placed without any intervals in the axial direction and practically form the inner-most layer, are set in the circumferential direction, the reinforcing fibers placed in the circumferential direction can work even if the section of the fishing rod is deformed into a oblong oval when the fishing rod is bent, and can prevent the fishing rod from breaking down by pressure.

According to another preferred embodiment of the present invention, the reinforcing fibers of the prepreg in the second layer are set at the axial direction, and cross fibers are inserted. The reinforcing fibers cross each other.

Its working and effect are as follows: As reinforcing fibers are applied in the axial direction, the reinforcing fibers can work for the tensile strength which works in the axial direction in order to maintain the strength, and the cross fibers can slightly resist against the deformation pressure to deform the fishing rod section into a oblong oval.

What is more, the cross fibers can restrain scattering of the reinforcing fibers in the axial direction when winding and forming the first layer round the mold core.

An additional preferred embodiment of the present invention provides a device which allows the reinforcing fibers placed in the axial direction to exert their reinforcement function, while facilitating manufacture and mitigating friction resistance of the line at times of winding and unwinding. According to this preferred embodiment, mold releasing agent is applied to the mandrel; notched/protrusive forming tape is wound to form the notched portions and protrusive portions around the outer circumferential surface of the mandrel to which the mold releasing agent is applied in the axial direction of the mandrel at fixed intervals, thereby forming a mold core; the fishing rod body is formed by winding prepreg tape around the mold core as the first layer, which has the same thickness and is set at the same fixed intervals as the notched/protrusive forming tape and which contains resin and reinforcing fibers in the circumferential direction, so that it is positioned within the aforesaid fixed intervals of the notched/protrusive forming tape, winding prepreg tape made from resin and reinforcing fibers set in the circumferential direction over the first layer as the second layer and winding prepreg comprising resin and reinforcing fibers set in the axial direction over the second layer as the third layer. Form-maintaining tape is then wound round the outer circumferential surface of the fishing rod body. The fishing rod body is then hardened, the mandrel is removed, the form-maintaining tape is peeled off, and the notched/protrusive forming tape is peeled off from the fishing rod body in order to form the inner circumferential surface in the fishing rod body into a notched/protrusive surface.

Its working and effect are as follows: By winding the notched/protrusive forming tape round the mandrel in the axial direction at fixed intervals and placing the prepreg tape as the first layer within the intervals of the notched/protrusive forming tape, when the notched/protrusive forming tape is removed after hardening, the prepreg tape as the first layer remains and forms a notched/protrusive surface together with the second layer.

The prepreg tape and the notched/protrusive forming tape are in effect wound in parallel rings without any gaps, each ring having generally the same thickness, thus forming an even layer on the mold core. Thus, by employing a manufacturing method to wind round the prepreg tape which has the same thickness as the notched/protrusive forming tape at the aforesaid fixed intervals, difference in outer level between the notched/protrusive forming tape and prepreg tape is eliminated. Hence, the second and the third layers can be wound round the even surface. Therefore, the reinforcing fibers placed in the axial direction will not meander from where they should be placed, and the function of the reinforcing fibers can be exerted as it is expected.

Reference will be made to FIGS. 1–12 in the following explanation of manufacturing processes according to the invention.

Figure 1B:
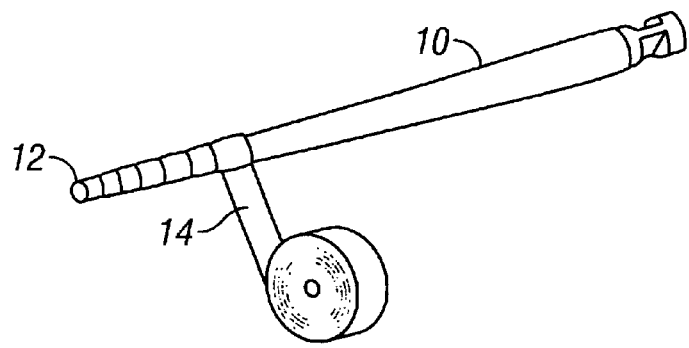
Figure 1C:
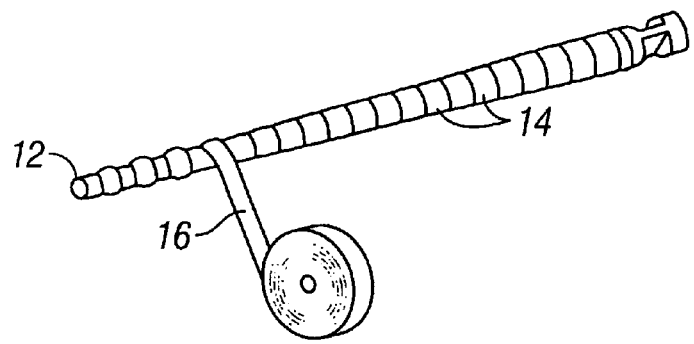
Figure 1D:
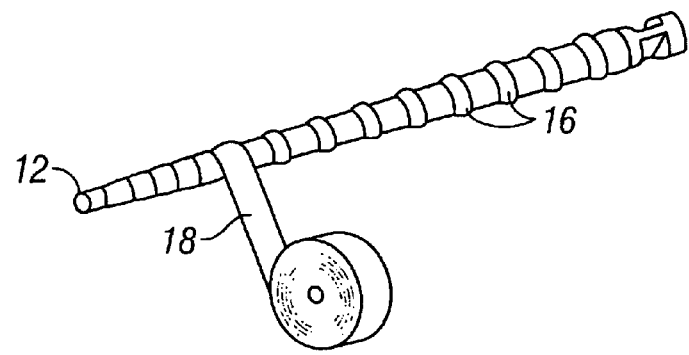

According to a preferred manufacturing procedure of the invention, wax 10 is applied as a mold releasing agent to mandrel 12 as shown in FIG. 1(a). The mandrel 12 is an elongated tapered shaft to define the basic shape of the subsequently produced hollow fishing rod. Polyester tape 14 for mold releasing is wound over mandrel 12 closely (preferably leaving an unwrapped length at either end of mandrel 12) so that the side of a rotation of tape 14 either overlaps or abuts the side of the next rotation so that no gaps are formed between adjacent windings, as shown in FIG. 1(b). Tape 16 for notched/protrusive forming is wound in the axial direction of the mandrel 12 at fixed intervals as shown in FIG. 1(c) forming gaps between windings. The base material of this tape 16 to form a notched/protrusive surface is cloth and is required to have flexibility to cope with the mandrel 12, thermal resistance to maintain accuracy of the notched/protrusive surface and stretching-resistance to maintain accuracy of the fixed intervals in the axial direction of the mandrel 12. As shown in FIG. 1(d), polyester tape 18 is wound closely over the notched/protrusive forming tape 16 so that the side of a rotation of tape 18 abuts or overlaps the side of the next rotation of tape 18. By doing this, removal of notched/protrusive forming tape 16 becomes easy.

The mandrel 12 wrapped by tapes 14, 16 and 18 forms a "mold core."

Figure 2A:
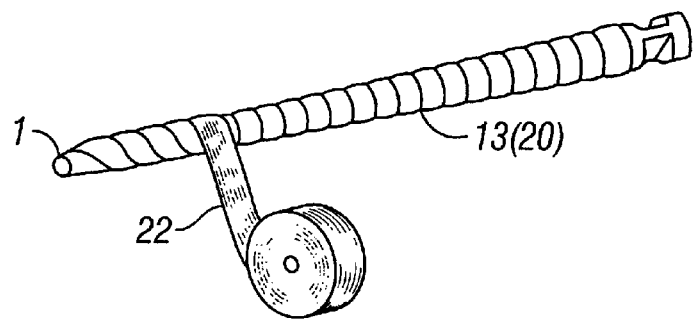
Figure 2B:
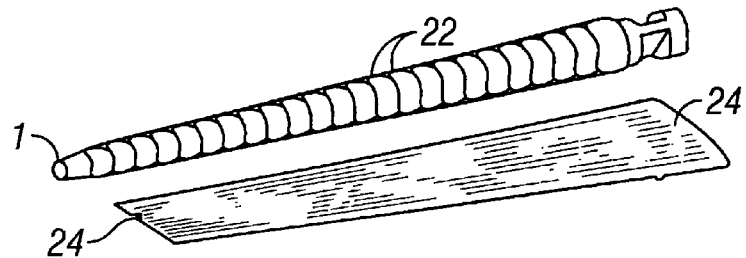
Figure 2C:
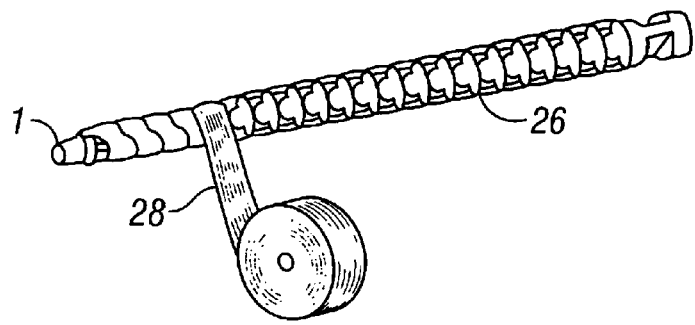
Figure 4:
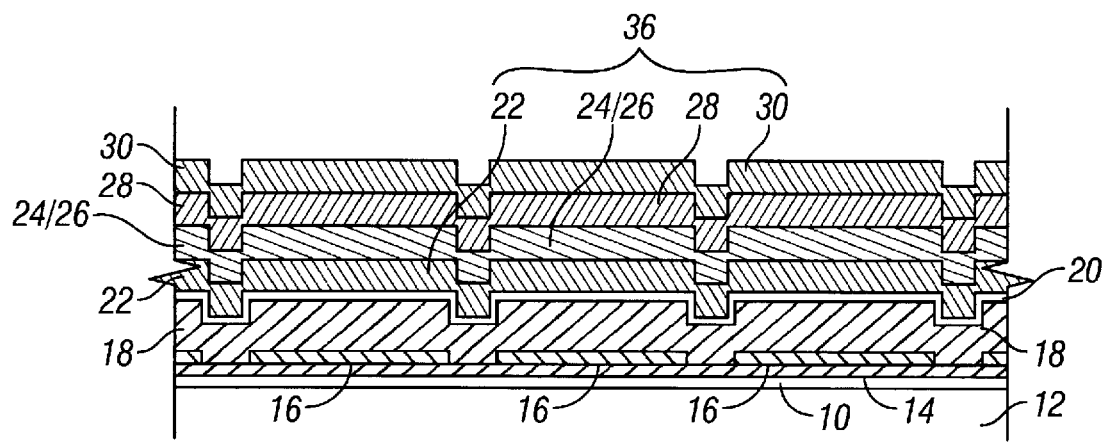
FIG. 4 is a longitudinal side-view to show the cross-sectional structure corresponding to FIG. 2(d).

Oily wax 20 then is applied to the polyester tape 18 is wound over notched/protrusive forming tape 16 so that notched/protrusive forming tape 16 is peeled off in a good condition. This oily wax 20 is designed to remain on the inner surface of the fishing rod (equivalent to notched portion 32 and protrusive portion 34, which will be described later), where notched/protrusive forming tape 16 has already been taken away, in order to give a water-repellent function to the surface. By this condition, sheet prepreg, which is made of epoxy resin-impregnated carbon fibers placed in the circumferential direction, is cut in the shape of a tape and this tape is closely wound around the mold core so that the side of a rotation of the tape contacts the side of the next rotation to form the inner-most layer 22 as shown in FIG. 2(a). Next, a prepreg sheet 24 is wound around the layer 22, the prepreg sheet 24 being a sheet of prepreg material having unidirectional fibers with epoxy resin therein, extending substantially the length of the mold core, but wound around the entire outer diameter of the mold core so that the fibers extend the longitudinal length of the mold core. After winding prepreg sheet 24 over it to form swelling mating parts at both front and rear ends, a prepreg tape in which carbon fibers are placed in the axial direction is wound closely over prepreg sheet 24 so that the side of a rotation of the tape contacts the side of the next rotation to form the second layer 26 in combination with prepreg sheet 24 as shown in FIG. 2(b). Then, a prepreg tape in which carbon fibers are placed in the circumferential direction, and a prepreg tape in which carbon fibers are placed in the axial direction are wound to form the third and the fourth layers 28 and 30, respectively, and fishing rod body 36 composed of four layers is formed as shown in FIG. 4.

Figure 2D:
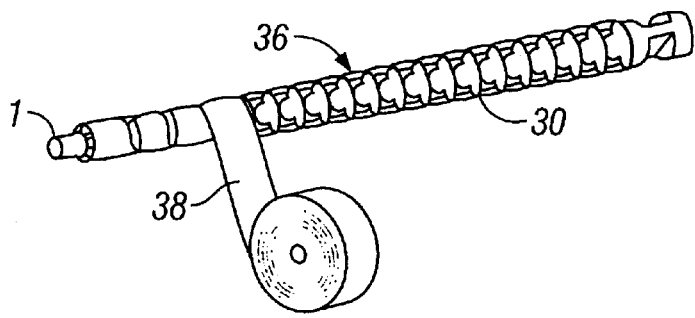
Figure 3A:
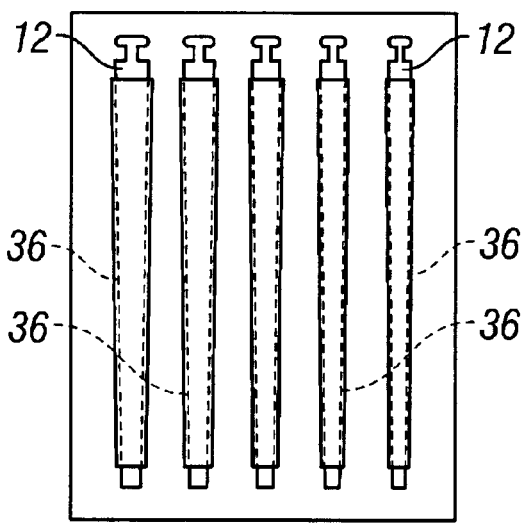
Figure 3B:
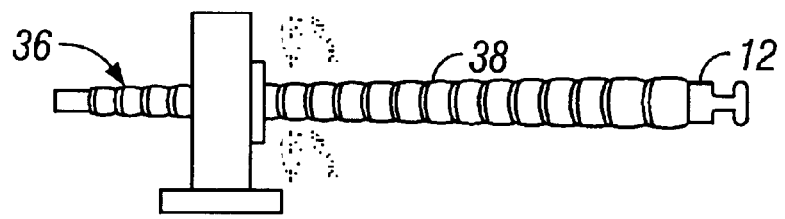
Figure 3C:
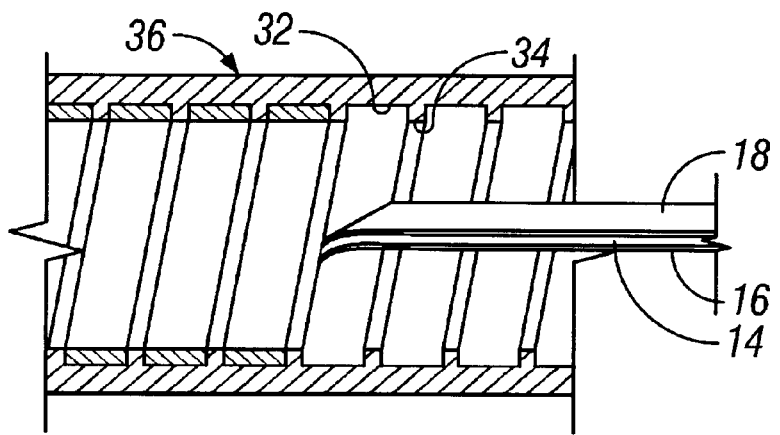

Over such fishing rod body 36, polyester tape 38 is wound as form-maintaining tape as shown in FIG. 2(d), then is hardened as shown in FIG. 3(a). The rod body can be hardened by any of a variety of hardening means, such as exposing the layers to ultraviolet light, heating the material or adding a hardening agent. Then polyester tape 38 is peeled off after hardening as shown in FIG. 3(b), and notched/protrusive forming tape 16 is removed together with mold releasing tape 14 and 18 as shown in FIG. 3(c). By such procedures, fishing rod body 36 which has notched portions and protrusive portions 32, 34 in a spiral on its inner circumferential surface can be formed and fibers can be placed in the circumferential direction within protrusive portions 34.

Figure 5:
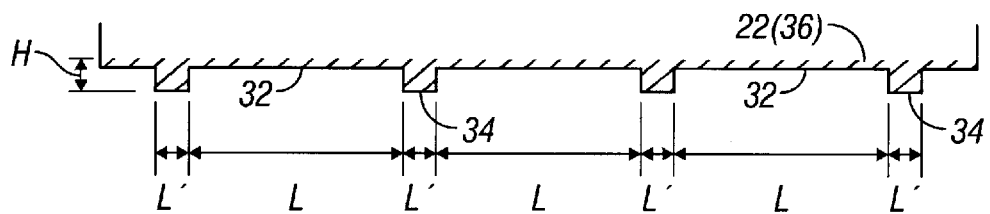
FIG. 5 is a longitudinal side-view to show the configuration of the notched/protrusive surface.
Figure 6:
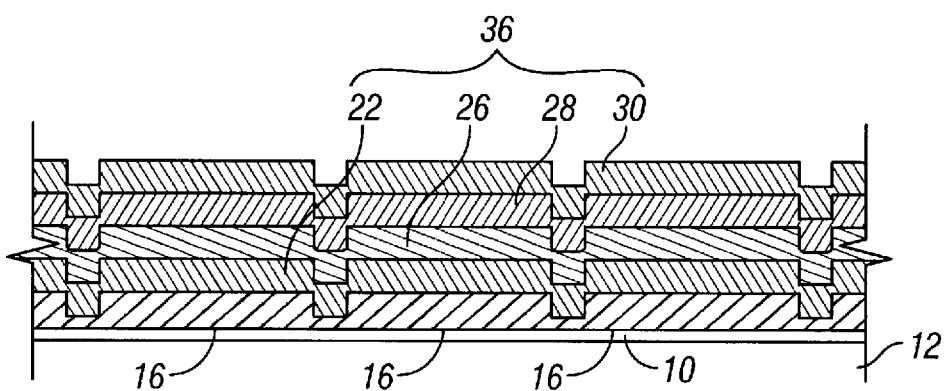
FIG. 6 is a longitudinal side-view to show the laminated structure shown in FIG. 4 less the mold releasing tape and the wax.

Next, the configurations of notched portions and protrusive portions 32, 34 are explained. As shown in FIG. 5, preferred dimensions of a notched portion 32 and protrusive portion 34 are as follows: protrusive portion 34's length= 0.8–1.2 mm, notched portion 32's length=6.7–7.3 mm, and protrusive portion 34's height=0.4–0.6 mm. Cross-sectional configuration of protrusive portion 34 is close to a square but trapezoid or triangle may also be accepted. Round corners instead of acute corners may also be employed.

As mentioned above, by forming notched portions 32 and protrusive portions 34 on the inner circumferential surface of fishing rod body 36, the friction resistance produced at times of winding and unwinding of the fishing line can be reduced almost by half, preferably to 0.3–0.7 g in comparison with the ones where no notched/protrusive surface 32 and 34 is formed. (Other conditions for this calculation are: the minimum diameter and length of fishing rod body 36 are 10 mm and 360 mm, respectively, the diameter of the hard guide ring to be attached inside fishing rod body 36 is 8 mm, and the fishing line preferably is made of polyethylene or nylon and has diameter of 0.285 mm. Of course, other materials and dimensions can be selected as desired.)

Next, another manufacturing method for fishing rod body 36 is explained. In this method, after applying wax 10 to mandrel 12, notched/protrusive forming tape 16 is directly wound over it at fixed intervals, and then prepreg tape is wound as the first layer 22 closely so that the side of a rotation of the tape abuts or overlaps the side of the next rotation. The cross-sectional configuration of fishing rod body in the aforesaid case looks as FIG. 6.

By this method, manufacturing processes can be simplified as it does not need polyester tape 14 and 18 for mold releasing.

In order to take the aforesaid manufacturing method, notched/protrusive forming tape 16 must have good releasability by itself as notched/protrusive forming tape 16 directly touches the first layer 22. By employing the aforesaid manufacturing method, a water-repellent effect is given as wax 10 is applied to protrusive portions 34 made by the first layer 22, and hydrophilicity is given to notched portions 32 as surface processing is applied to notched/protrusive forming tape 16. Therefore, water, etc. can be discharged by the water-repellence effect of protrusive portions 34 which hold the line, resulting in less chances of contacts between the line and water, and discharge of water from the notched portions 32 can be restrained thanks to the hydrophilicity of notched portions 32, which also results in reduced chances of contacts between the line and water.

The following lamination configurations can also be applied for fishing rod body 36.

Figure 7:
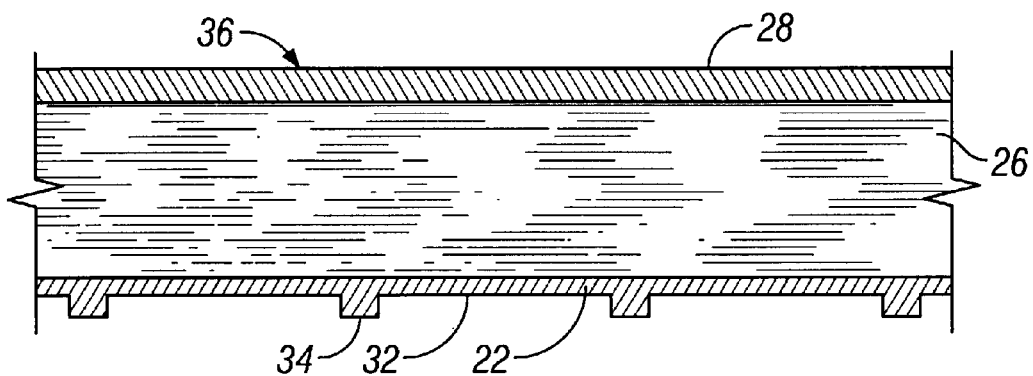
FIG. 7 is a longitudinal side-view to show the cross-section of the fishing rod of 3-layer structure.

As shown in FIG. 7, prepreg in which reinforcing fibers are placed in the circumferential direction as the first layer 22, prepreg in which reinforcing fibers are placed in the axial direction as the second layer 26, and prepreg in which reinforcing fibers are placed in the circumferential direction as the third layer 28 are wound respectively. Here, the second layer 26 must be more than three times as thick as the first layer 22 and the third layer 28. By such a structure, fibers can be placed in the circumferential direction within protrusive portions 34 of the notched/protrusive surface 32, 34 formed in the inner surface of the first layer 22.

Figure 8:
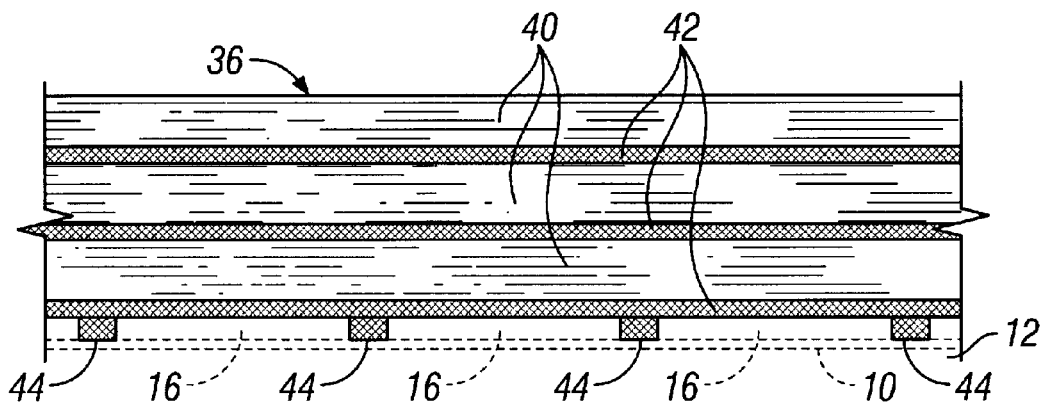
FIG. 8 is a longitudinal side-view to show a structure of combination of prepreg in which reinforcing fibers are placed in the axial direction and glass cloth fibers.

As shown in FIG. 8, fishing rod body 36 may be formed by putting prepreg 40, in which reinforcing fibers are placed in the axial direction, in multiple layers and inserting glass cloth 42, in which reinforcing fibers are placed in two directions, in between the layers of prepreg 40. The manufacturing method in this case preferably is as follows: notched/protrusive forming tape 16 is wound at the fixed intervals round mandrel 12 to which wax 10 has been applied, and prepreg tape 44 is wound within the intervals to make the height of the surface even. Then, glass cloth 42 is wound over it. By the presence of glass cloth 42 between the layers as such, dispersion of prepreg in which reinforcing fibers are placed in the axial direction can be avoided when it is wound round.

Figure 12:
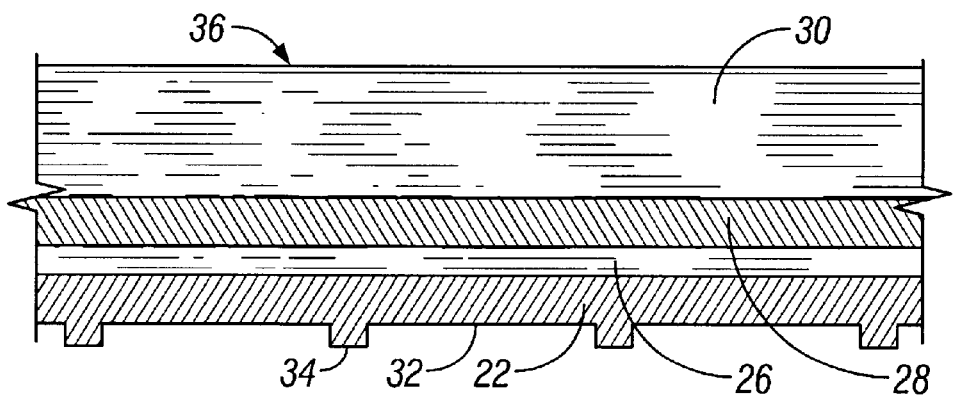
FIG. 12 is a sectional view to show the 4-layer structure.

As shown in FIG. 12 fishing rod body 36 can also be formed by placing prepreg in which reinforcing fibers are set in the circumferential direction as the first layer 22, forming notched portions 32 and protrusive portions 34 on the inner surface of this first layer 22, placing prepreg in which reinforcing fibers are set in the axial direction as the second layer 26, placing prepreg in which reinforcing fibers are set in the circumferential direction as the third layer 28, and placing prepreg in which reinforcing fibers are set in the axial direction as the outer-most (fourth) layer 30. In this case, the first layer 22, the second layer 26 and the third layer 28 is set to have the same thickness and the fourth layer 30 is wound round in several plies so that it will be three to five times as thick as the first layer 22, and so on. By such a method, fishing rod body 36 with high bending strength can be formed.

The second layer 26 can be omitted from the aforesaid structure.

Other configurations of notched portions 32 and protrusive portions 34 are now explained.

Notched/protrusive surface 32, 34 can be formed in a spiral as shown in FIG. 3(c). Protrusive portions 34 may be in a ring form in this structure. In such a case, when winding notched/protrusive forming tape 16, tape 16 must be wound round each notched portion 32 to define a ring.

By forming each protrusive portion 34 in the form of a ring in the circumferential direction, protrusive portions 34 and carbon fibers placed in the circumferential direction have the same direction. Therefore, the carbon fibers do not have to be bent as they do not cross the switching point of the notched portions and protrusive portions. Hence, excellent strength against bending of the fishing rod can be maintained.

Figure 9:
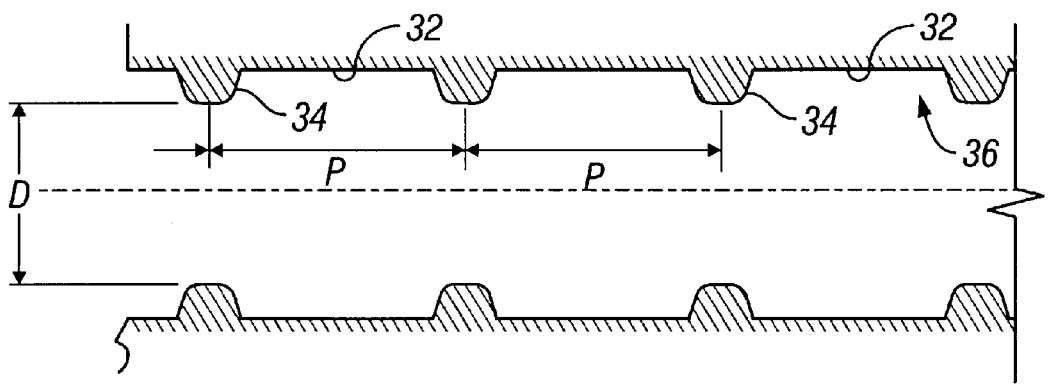
FIG. 9 is a longitudinal side-view to show the cross-section of the protrusive portion in a trapezoid.

Next, with reference to FIG. 9, the cross-sectional configuration of each protrusive portion 34 is made into a trapezoid to assure easy removal of notched/protrusive tape 16 in order to avoid abrasion of the corners of the protrusive portion. The inventors have investigated the effects of interval "P" in the axial direction of protrusive portion 34 of notched portions and protrusive portions 32, 34 in the ring form, and confirmed that, even if the inner diameter of protrusive portion 34, "D", varies from 1.0 mm, 2.0 mm, 3.0 mm to 4.0 mm, when interval "P" is less than approximately 100 mm, the friction resistance stays around approximately 0.3–0.5 g, and when interval "P" is between 100 mm and around 400 mm, there is a tendency that the friction resistance rises at a certain rate till 1.0 g.

Figure 10:
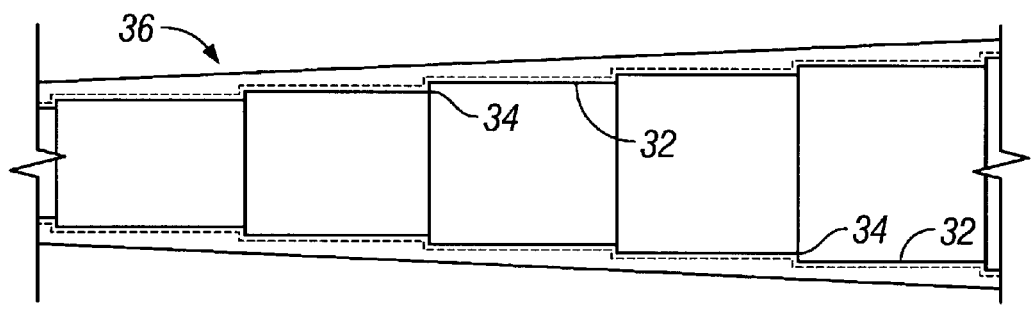
FIG. 10 is a longitudinal side-view to show the configuration of the notched/protrusive surface formed in tiers.

As shown in FIG. 10, notched portions and protrusive portions 32, 34 may be formed into tiers whose diameter is reduced as it gets closer to the front end. In this case, as sea water, etc. brought inside the fishing rod can move to the tiers in the back without staying, the water can be collected at the rear end of the rod and discharged out.

Other working structures are now explained.

Figure 11:
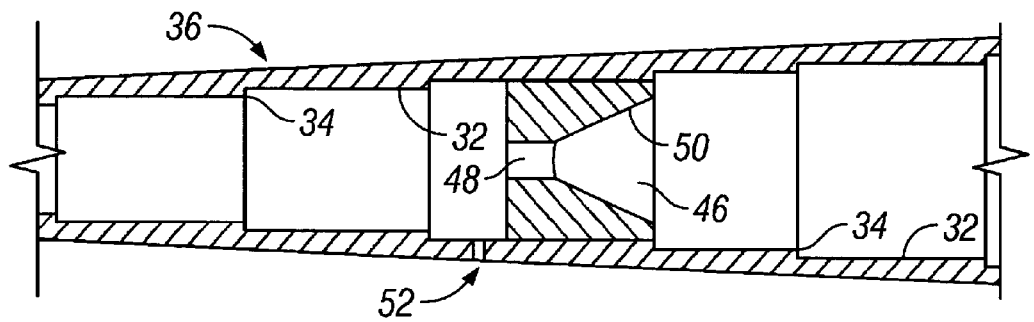
FIG. 11 is a longitudinal side-view to show a situation in which a line holder is attached to the notched/protrusive surface.

As shown in FIG. 11, articles different from notched portions 32 and protrusive portions 34 can be attached as line holders 46, i.e., a line-inserting hole 48 and a conical guide surface 50 which guides the line to this line-inserting hole 48 are formed as line holder 46, and this line holder 46 is set and fixed, by any desired means such as by adhesive bonding or mechanical compression, in protrusive portion 34 of notched portions and protrusive portions 32, 34. As line holder 46 is contained in the notched/protrusive surface by this procedure, the line held by line holder 46 is maintained at a wider distance from the inner surface of the fishing rod than being held by notched portions and protrusive portions 32, 34 contributing to further reduction of chances of contacts between water and the line. What is more, even if the line slacks between the two adjacent line holders 46, the aforesaid protrusive portions 34 can support the line as this portion also has a function to hold the line. Therefore, though it is to the lesser extent in comparison with the case of line holders 46, it can still reduce the chances for water to contact the line.

The aforesaid line holder 46 may be in the form of a ring and its material may be selected from a variety of ceramics, metals and resin.

Pertaining to the foregoing structure, some elastic deformation may be allowed for protrusive portions 34 which support line holders 46. Therefore, only by setting in line holders 46, protrusive portion 4 can hold line holders 46, and no special holding structure is required.

Not only thermosetting resins (including epoxy and phenolic resins) but also thermoplastic resins, such as nylon, may be used for the prepreg to form the fishing rod. Also, other fibers such as boron fibers, as well as carbon fibers, may be used as reinforcing fibers.

Thermal-contraction tape may be used as form-maintaining tape 38.

Not only wax but silicone can also be used as mold releasing agent 10.

Pertaining to the aforesaid fishing rod body 36, a through hole 52 may be formed in fishing rod body 36 in order to discharge water out through an internal path for the line.

What is claimed is:

1. A pass-through fishing rod comprising a rod body comprised of a material made from resin and reinforcing fibers, said rod body having an inner circumferential surface, wherein notched surface portions and protrusive surface portions are formed in said inner circumferential surface of said rod body, and wherein said reinforcing fibers are disposed in said protrusive surface portions in the circumferential direction.

2. The pass-through fishing rod of claim 1, said rod having a front end, wherein said notched surface portions and protrusive surface portions are arranged in tiers having diameters which decrease as said tiers approach said front end.

3. The pass-through fishing rod of claim 1, said rod having a front end, wherein said notched surface portions and protrusive surface portions are arranged in a spiral the diameter of which decreases as said spiral approaches said front end.

4. The pass-through fishing rod of claim 1 wherein said protrusive surface portions have square, rectangular, trapezoidal or triangular cross-sections.

5. The pass-through fishing rod of claim 1 wherein said reinforcing fibers are carbon fibers, boron fibers or mixtures thereof.

6. The pass-through fishing rod of claim 1 wherein said resin is a thermoplastic or thermosetting resin.

7. The pass-through fishing rod of claim 6 wherein said resin is an epoxy resin.

8. The pass-through fishing rod of claim 1 wherein said notched surface portions have a length from about 0.8 to 1.2 mm and a height from about 0.4 to 0.6 mm, and said protrusive surface portions have a length from about 6.7 to 7.3 mm.

9. The pass-through fishing rod of claim 1 further comprising a reel and a fishing line.

10. The pass-through fishing rod of claim 1 further comprising a line holder disposed within said rod.

11. The pass-through fishing rod of claim 1 wherein said reinforcing fibers are also disposed in said notched surface portions in the circumferential direction.

12. A pass-through fishing rod comprising a rod body, said rod body having a first layer and a second layer, said rod having an inner circumferential surface, wherein said first layer comprises a narrow prepreg tape containing reinforcing fibers set in the circumferential direction, said tape being placed along the circumferential direction as well as in the axial direction at fixed intervals, and wherein said second layer comprises prepreg tape made from reinforcing fibers and resin, said tape being applied in the axial direction with no intervals, wherein differences in level between said first layer and said second layer form notched surface portions and protrusive surface portions on the inner circumferential surface of the fishing rod.

13. The pass-through fishing rod of claim 12 wherein the direction of the reinforcing fibers of the prepreg of said second layer is set at the circumferential direction.

14. The pass-through fishing rod of claim 12 wherein the direction of the reinforcing fibers of the prepreg in said second layer is set at the axial direction, said rod body further comprising cross fibers in which reinforcing fibers cross each other inserted between the first layer and the second layer.

15. A pass-through fishing rod comprising a rod body having an inner circumferential surface wherein a plurality of notched surface portions and protrusive surface portions wherein said rod body comprises a thermoplastic or thermosetting resin and reinforcing fibers, and wherein said reinforcing fibers are oriented in the circumferential direction within said protrusive surface portions.

16. The pass-through fishing rod of claim 15 wherein said reinforcing fibers are also disposed in said notched surface portions in the circumferential direction.

* * * * *